United States Patent
Barbeau et al.

(10) Patent No.: US 9,047,384 B1
(45) Date of Patent: Jun. 2, 2015

(54) SYSTEM AND METHOD FOR AUTOMATICALLY DETERMINING PURPOSE INFORMATION FOR TRAVEL BEHAVIOR

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US)

(73) Assignee: University of South Florida, Tampa, FL (US)

( * ) Notice: Subject to any disclaimer, the term of this patent is extended or adjusted under 35 U.S.C. 154(b) by 1278 days.

(21) Appl. No.: 12/013,789

(22) Filed: Jan. 14, 2008

Related U.S. Application Data

(60) Provisional application No. 60/884,645, filed on Jan. 12, 2007.

(51) Int. Cl.
*G06F 17/30* (2006.01)
*G07C 1/10* (2006.01)
*H04W 4/02* (2009.01)
*H04L 29/08* (2006.01)

(52) U.S. Cl.
CPC ...... *G06F 17/3087* (2013.01); *G06F 17/30241* (2013.01); *G07C 1/10* (2013.01); *H04W 4/02* (2013.01); *H04L 67/18* (2013.01); *H04L 67/22* (2013.01)

(58) Field of Classification Search
CPC ......... G06Q 30/0201; G06Q 30/0202; G06Q 50/30; G06Q 20/3224; G06Q 30/0269; G08G 1/20; G06F 17/00; G06F 17/30241; G06F 17/3087
See application file for complete search history.

(56) References Cited

U.S. PATENT DOCUMENTS

| | | | |
|---|---|---|---|
| 4,819,174 A | 4/1989 | Furuno et al. | |
| 4,954,958 A | 9/1990 | Savage et al. | |
| 5,208,756 A | 5/1993 | Song | |
| 5,214,757 A * | 5/1993 | Mauney et al. | 715/751 |
| 5,515,043 A | 5/1996 | Berard et al. | |
| 5,543,789 A | 8/1996 | Behr et al. | |
| 5,587,715 A | 12/1996 | Lewis | |
| 5,732,074 A | 3/1998 | Spaur et al. | |
| 5,767,795 A | 6/1998 | Schaphorst | |

(Continued)

OTHER PUBLICATIONS database.pdf (http://www.merriam-webster.com/dictionary/database, Database—Definition and More from the Free Merriam-Webster Dictionary, Apr. 21, 2014, pp. 1-4).*

Wolf, J., R. Guensler and W. Bachman. 2001. "Elimination of the Travel Diary: An Experiment to Derive Trip Purpose from GPS Travel Data." Transportation Research Record 1768. p. 125-134.

(Continued)

*Primary Examiner* — Bao Long T Nguyen
(74) *Attorney, Agent, or Firm* — Molly Sauter; Courtney Dunn; Smith & Hopen, P.A.

(57) ABSTRACT

Disclosed is an automated trip-purpose detection method that utilizes GPS Data collected by GPS-enabled devices. The GPS data is compared against a GIS map to obtain various spatial and location characteristics of the surrounding area. This information is then used to derive a traveler's trip purpose. In a preferred embodiment, the inventive method is implemented automatically without any needed manipulation of GIS data. Additionally, the method integrates location information as defined by the user for critical locations such as home and work. These personalized locations allow the method to immediately identify the two most common types of trips: work-related trips and trips returning home.

20 Claims, 5 Drawing Sheets

(56) References Cited

U.S. PATENT DOCUMENTS

| | | | |
|---|---|---|---|
| 5,794,164 | A | 8/1998 | Beckert et al. |
| 5,948,040 | A * | 9/1999 | DeLorme et al. ............. 701/426 |
| 6,028,514 | A | 2/2000 | Lemelson et al. |
| 6,111,539 | A | 8/2000 | Mannings et al. |
| 6,154,658 | A | 11/2000 | Caci |
| 6,526,335 | B1 | 2/2003 | Treyz et al. |
| 6,542,076 | B1 | 4/2003 | Joao |
| 6,584,401 | B2 | 6/2003 | Kirshenbaum et al. |
| 6,832,140 | B2 | 12/2004 | Fan et al. |
| 6,862,524 | B1 | 3/2005 | Nagda et al. |
| 7,174,243 | B1 | 2/2007 | Lightner et al. |
| 7,336,964 | B2 * | 2/2008 | Casey ........................ 455/456.3 |
| 2002/0035432 | A1 * | 3/2002 | Kubica et al. ...................... 702/5 |
| 2004/0076279 | A1 * | 4/2004 | Taschereau ............. 379/218.01 |
| 2004/0243430 | A1 * | 12/2004 | Horstemeyer .................... 705/1 |
| 2005/0149258 | A1 | 7/2005 | Gargi |
| 2006/0025894 | A1 | 2/2006 | O'Connor et al. |
| 2006/0053146 | A1 * | 3/2006 | Allhusen et al. ............. 707/102 |
| 2006/0089787 | A1 | 4/2006 | Burr et al. |
| 2006/0122846 | A1 | 6/2006 | Burr et al. |
| 2006/0173618 | A1 | 8/2006 | Eyer et al. |
| 2008/0125959 | A1 * | 5/2008 | Doherty et al. ............... 701/200 |

OTHER PUBLICATIONS

Griffin, T., Y. Huang and R. Halverson. 2006. "Computerized Trip Classification of GPS Data." International Conference on Cybernetics and Information Technologies, Systems and Applications, Orlando, FLorida.

McCormack et al., Exploiting Object Oriented Methods for Multi-Modal Trip Planning Systems, Information and Software Technology, 1996, vol. 38, pp. 409-417.

Dillenburg et al., The Intelligent Travel Assistant, 2002, pp. 1-7.

Kumar et al., Advanced Traveler Information System for Hyderabad City, IEEE Transaction on Intelligent Transportation Systems, Mar. 2005, vol. 6, No. 1, pp. 26-37.

Linden et al., Interactive Assessment of User Preference Models: The Automated Travel Assistant, Department of Computer Science and Engineering, University of Washington, Seattle WA, 1997.

Murakami et al., Using Global Positioning Systems and Personal Digital Assistants for Personal Travel Surveys in the United States, TRB Transportation Research Circular E-C008: Raising the Standard, III-B, Aug. 2000, pp. 1-21.

Vincenty, Survey Review, Direct and Inverse Solutions of Geodesics on the Ellipsoid with Applications of Nested Equations, Apr. 1975, vol. XXIII, No. 176, Kingston Road, Tolworth, Surrey.

* cited by examiner

FIG. 2

| Code-id | Use-code | Property-Type |
|---------|----------|---------------|
| 1 | 0 | VACANT |
| 14 | 0396 | STUDENT HOUSING |
| 241 | 8500 | HOSPITAL |
| 130 | 3500 | TOURIST ATTRAC |
| 57 | 1300 | DEPT STORE |
| 229 | 8200 | FOREST/PK/REC |

FIG. 3

| Code_id | Purpose_id | Specific Purpose_ID |
|---------|------------|---------------------|
| 130 | 5 | 9 |
| 57 | 4 | 4 |
| 229 | 5 | 9 |
| 241 | 3 | NULL |
| 14 | 8 | NULL |
| 1 | 9 | NULL |

FIG. 4

| GENERAL PURPOSE | SPECIFIC PURPOSE | | | |
|---|---|---|---|---|
| 1. Work | | | | |
| 2. School or Religious | 1. Go to school | 2. Go to a religious activity | 3. Go to the library: school related | |
| 3. Medical or Dental | | | | |
| 4. Shopping and Errands | 4. Buy goods: groceries, clothing, house needs, gardening needs, etc. | 5. Buy services: post office, bank | 6. Car services: pump gas, car maintenance | 7. Personal or family business |
| | 17. Pick up or drop off an item: dry cleaners, video rental, etc. | | | |
| 5. Social and Recreational | 8. Go to the gym, exercise, play sports, etc. | 9. Rest, relaxation, or vacation | 10. Visit friends or family | 11. Go out: entertainment, theater, sports event, bar, etc. |
| | 12. Visit public place: historical site, museum, park, etc. | | | |
| 6. Transportation of Someone or Myself | 13. Pickup someone | 14. Take and wait for someone | 15. Drop someone off | 16. Change mode of transportation (go to train station, bus stop) |
| 7. Meals | 18. Go out to eat (restaurant, fast food) | 19. To go (fast food, coffee, restaurant takeout) | | |
| 8. Return home | | | | |
| 9. Other | | | | |

US 9,047,384 B1

SYSTEM AND METHOD FOR AUTOMATICALLY DETERMINING PURPOSE INFORMATION FOR TRAVEL BEHAVIOR

CROSS-REFERENCE TO RELATED APPLICATIONS

This application is a Non-Provisional Application of U.S. Provisional Application No. 60/884,645, filed Jan. 12, 2007, which is incorporated herein by reference.

STATEMENT OF GOVERNMENT INTEREST

This invention was made with Government support under Grant No. 2117760900 and 21177760900 awarded by the Florida Department of Transportation. The Government may therefore have certain rights in the invention.

FIELD OF INVENTION

This invention relates to GPS technology and data collection.

BACKGROUND OF THE INVENTION

In recent years, research into the automation of traffic data collection with GPS technology has shown remarkable feasibility for replacing traditional resources of traffic data. Paper diaries and phone interviews are two such resources that are heavily depended upon by the traffic and travel research industry. Recent studies compared vehicle-based GPS data to manually recorded data in Travel Diaries to evaluate the efficiency of automated purpose derivation systems. Among its other functions, one of the most consequential uses of travel diaries has been the reporting of an individual's purpose for travel.

Several studies conducted in the past explored implementing GPS data with manual and electronic travel diary submissions. Some of these studies were the first to use passively recorded GPS data. (See Wolf, J., R. Guensler and W. Bachman (2001) "Elimination of the Travel Diary: An Experiment to Derive Trip Purpose from GPS Travel Data," Transportation Research Record 1768, p. 125-134, Aug. 3, 2006, which is incorporated herein by reference). The study conducted by Wolf et al. utilized a GIS database and GPS data collected by thirteen individuals carrying GPS enabled PDAs. (See also, Wolf, J. (2004) "APPLICATIONS OF NEW TECHNOLOGIES IN TRAVEL SURVEYS," Submitted to the International Conference on Transport Survey Quality and Innovation, Costa Rica, August 2004, which is incorporated herein by reference). To derive trip purpose, researchers used a point-in-polygon analysis to retrieve a land use code. A set of purposes of varying detail were associated with individual land use codes based on a 1990 Atlanta household travel survey. (See also Atlanta Regional Commission. 1990 Household Travel Study: Final Report. The Atlanta Regional Commission, December, 1993, which is incorporated herein by reference). The land use code was used to derive trip purpose by using a code-purpose association. Wolf et al. faced several obstacles during the land use code categorization step because GIS database used relied on center points. This flaw in the database necessitated manually defining business boundaries in the GIS database based on photographic references. Although the Wolf study was conducted while Atlanta's GIS inventory was still premature, land uses were successfully determined for 145 out of 156 trips.

Another study was conducted by Griffin et al. which concluded that the reliance on geocoded maps to identify locations based on GPS data is impractical because a large percentage of the United States remains to be geocoded. (Griffin, T., Y. Huang and R. Halverson (2006), "Computerized Trip Classification of GPS Data," *International Conference on Cybernetics and Information Technologies, Systems and Applications*, Orlando, Fla., which is incorporated herein by reference). Griffin et al. utilized a clustering method known as Dbscan to determine points of interests (POI). POI are simply a cluster of points that were accumulated from an individual frequenting a particular location. These POI were classified by trip purpose based on a decision tree and a learning method known as C4.5. Trip purposes were derived by comparing POI and their established trip purpose to coordinate data transmitted by a GPS enabled PDA. The derivation process, however, was not totally automated. Each POI's purpose had to be manually classified before they could be compared to a GPS coordinate position. The derivation process was no less dependant on human memory than a travel diary as a result of the involvement of human input. The trip classification framework produced correct results between 70% and 97% for all data values despite questionable automation authenticity related to the trip purpose derivation process.

SUMMARY OF INVENTION

The disclosed method includes an automated travel purpose detection method that utilizes GPS Data collected by GPS-enabled devices. The GPS data is compared against a GIS map to obtain various spatial and location characteristics of the surrounding area. This information is then used to derive a traveler's trip purpose.

In a preferred embodiment, the inventive method is implemented automatically without any needed manipulation of GIS data. Additionally, the method integrates location information as defined by the user for critical locations such as home and work. These personalized locations allow the method to immediately identify the two most common types of trips: work-related trips and trips returning home.

BRIEF DESCRIPTION OF THE DRAWINGS

For a fuller understanding of the invention, reference should be made to the following detailed description, taken in connection with the accompanying drawings, in which:

FIG. 2 is an illustrative use-table.

FIG. 3 is an illustrative purpose-table.

FIG. 4 is a representation of the purpose-ids based on the U.S. Department of Transportation National Household Travel Survey.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Transportation engineers depend on the responsibility and accurate memory of travel survey respondents to recall and record their travel history. However, because of the large number of distractions and the burden of maintaining a travel diary some of the collected data from respondents' is often flawed and inconsistent. In particular, fatigue has been an issue that has afflicted many traffic data collection surveys.

The integrity and accuracy of collected data is imperative because it is used to configure and adjust travel demand models. Travel demand models are used to estimate transportation activity over time and project future travel needs. Currently, the only authoritative national source of personal travel behavior data is the National Household Travel Survey (NHTS), formerly known as the NPTS. Created in 1969, and conducted every six to seven years, the data collected by the NTHS is used to determine how travel has changed and developed as a whole in the United States. The NHTS provides information about personal travel behavior including the purpose of the trip, mode of transportation, trip length, time and date of trip, occupancy (number of people taking a trip), and many other trip properties.

The latest NHTS was conducted in 2001 with computer-assisted-telephone-interviewing (CATI) technology. Respondents were divided into two groups: the first were only required to participate in a telephone interview and the second were asked to provide feedback based on a travel diary for an assigned travel day. The respondents who maintained travel diaries were interviewed within a six day window following the day after their assigned travel day. The call-back window was determined by the US Department of Transportation because of memory difficulties beyond six days. In total, the 2001 NHTS took 14 months to complete and cost approximately 10 million dollars for 25,000 households at 411 dollars each.

Geographic Information Systems (GIS) and Global Positioning System (GPS) are two related technologies that provide the opportunity to implement a highly sophisticated level of accuracy in travel research. Both technologies have exceptionally powerful means to generate accurate global and local spatial data. Geographic Information Systems (GIS) digitally represents the geospatial and geographic characteristics of a region of Earth. A trip path can be accurately represented digitally using a set of Feature Classes By using a GIS map region, such as a city. Feature Classes include polygons, points, or polylines—a series of points connected with lines.

Figure 1A:
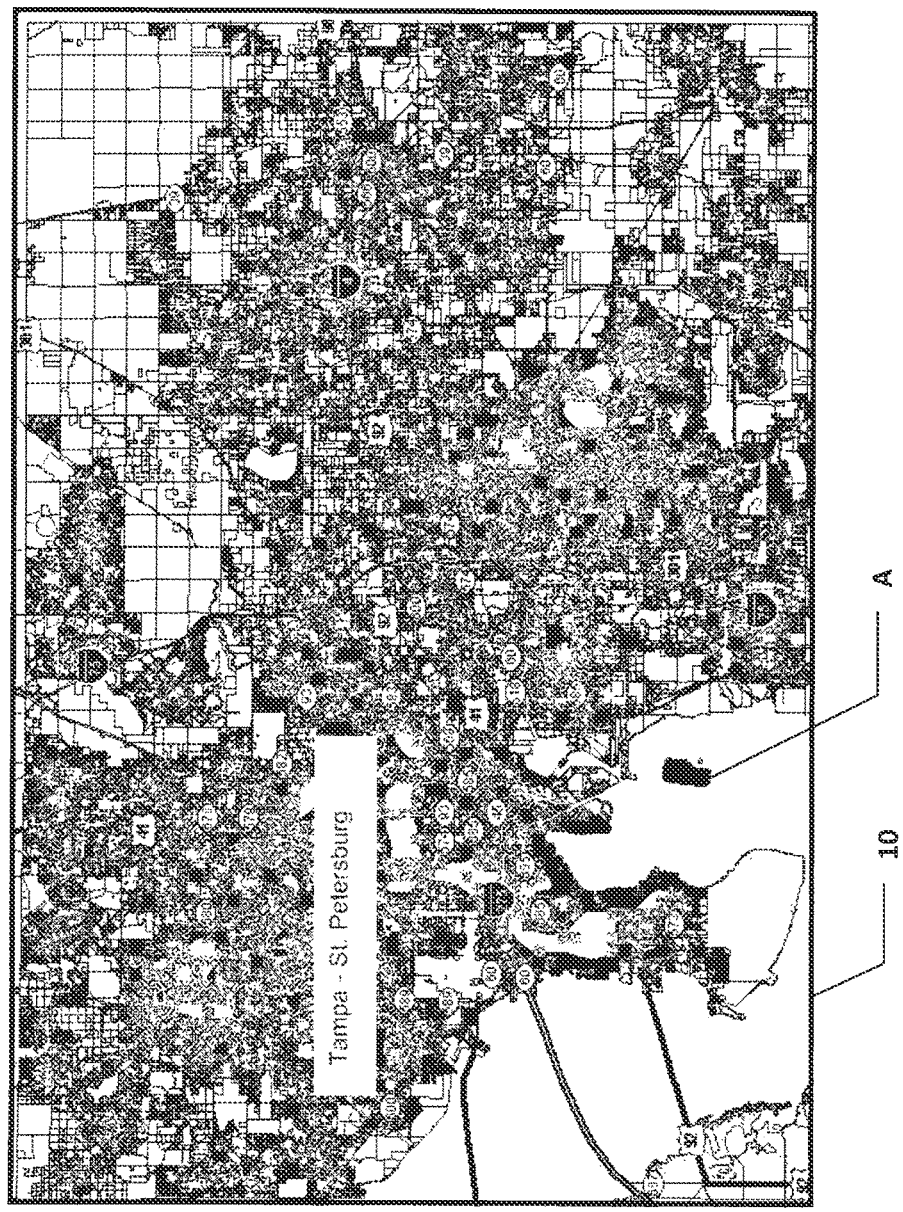
FIG. 1A is an example of a GIS map.
Figure 1B:
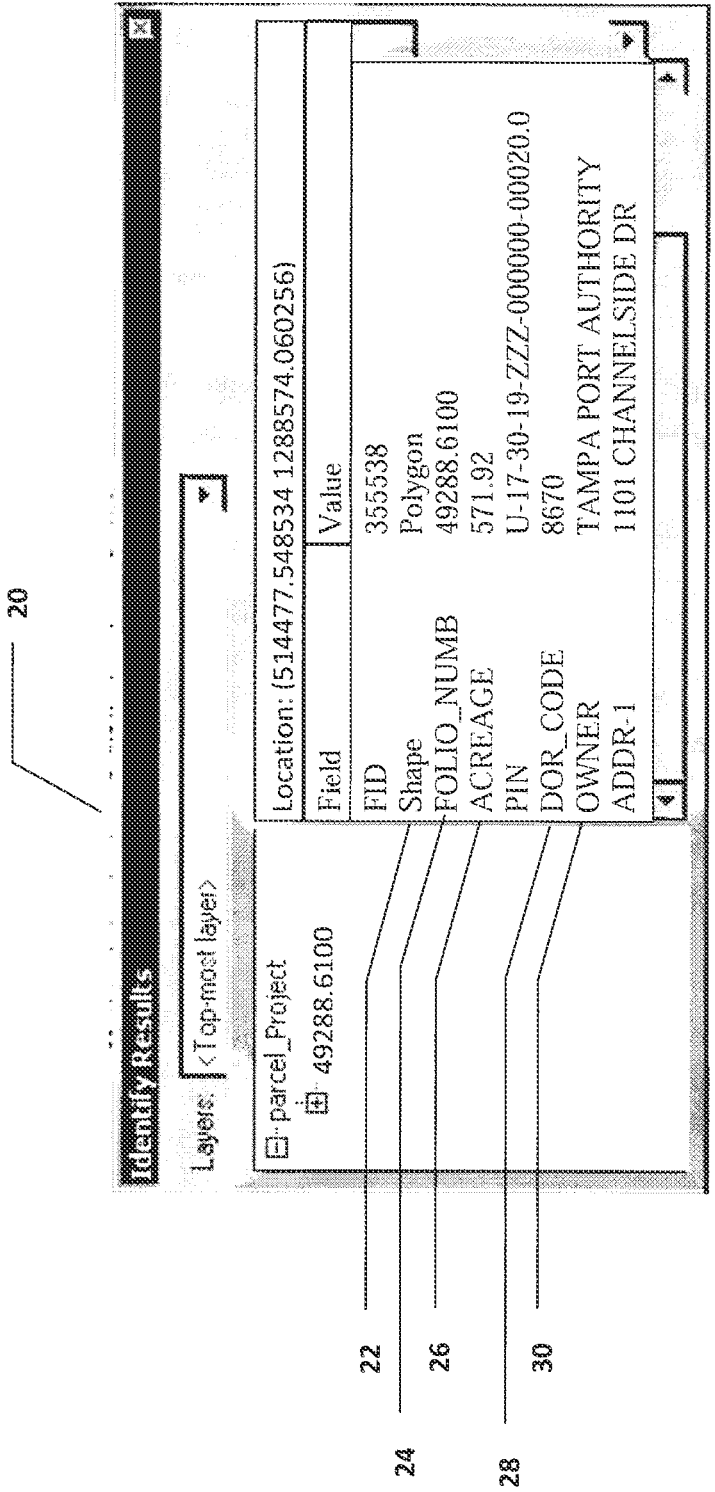
FIG. 1B is an image of an attribute table associated with the area selected on the GIS map (FIG. 1A).
Figure 5:
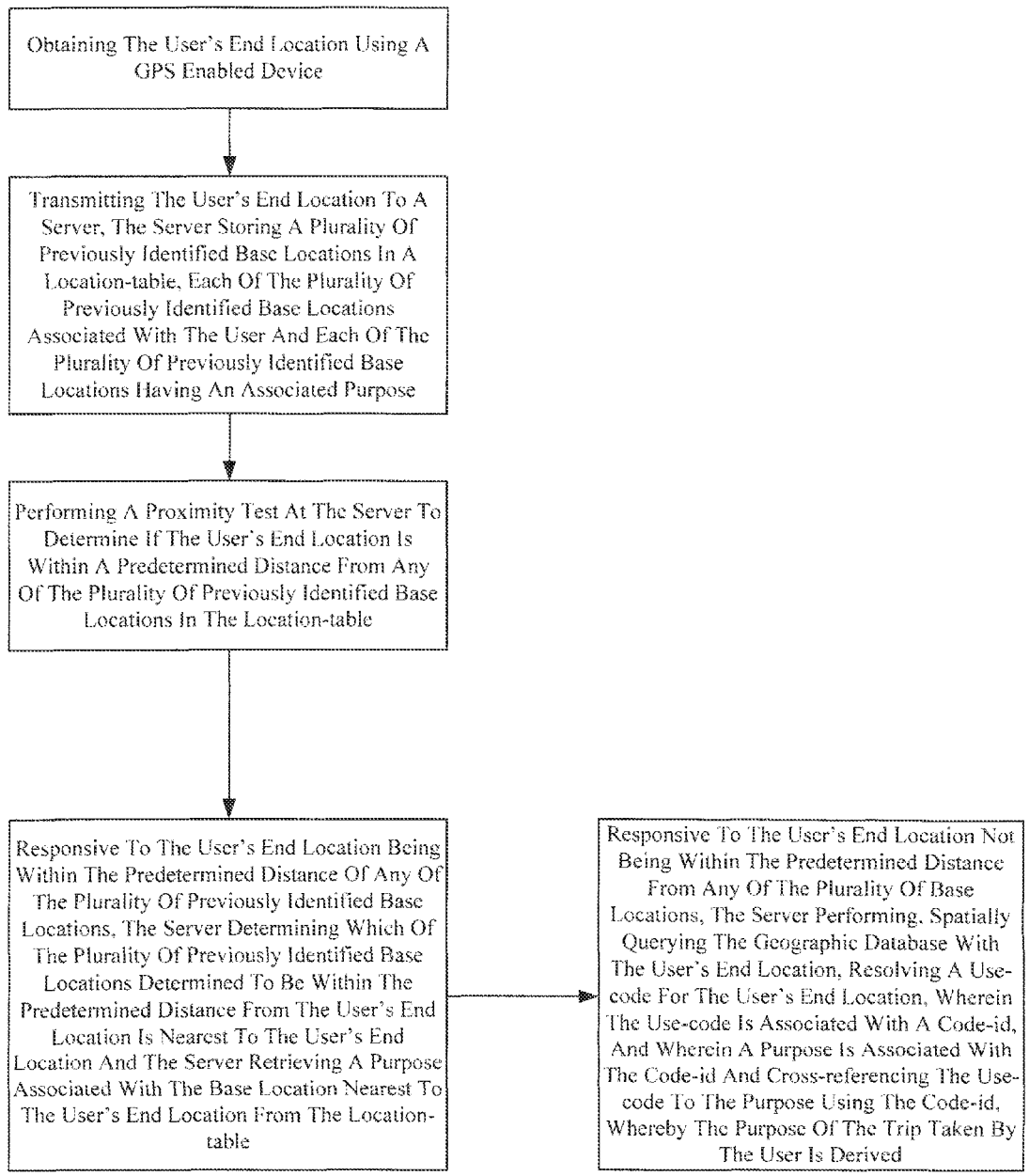
FIG. 5 is a flow diagram illustrating a method of collecting user trip data in accordance with an embodiment of the present invention.

In an illustrative embodiment, polygons were used which represent the boundaries of a business' premise; points were used to represent the final position of the user for a particular trip. A GIS map attribute table was used to access parcel information for each polygon. Attribute tables contain information related to the polygon's shape, address, ownership, business type, acreage and more. The fields are customizable, in a preferred embodiment, and vary depending on the needs of the user. FIG. 1A is a GIS map (10) in ARCMAP™, a GIS mapping program, and FIG. 1B is an attribute table (20) for the selected polygon (A, FIG. 1A). Attribute table 20 comprises fields such as associated map shape 22, Folio Number 24, Acreage 26, Use-code (DOR CODE) 28 and property owner 30. The fields are customizable to allow adjustments for particular uses.

A GPS-enabled device automatically calculates data such as coordinate data, temporal information related to a single coordinate, heading, velocity, and trip route without the need for feedback from the individual. Data related to the position of a single GPS enabled device supports accuracy between 2-5 meters with the dissolution of Selective Availability (SA) in May of 2000. Assisted-GPS (A-GPS) utilize information from a cellular network to reduce the time required to obtain location information from a GPS device and enhance position data accuracy.

EXAMPLE

Data Preparation

A relational database was constructed comprising several tables, namely: a use-table, purpose-table, locations table, trip-data table and trip-table. Each table is discussed in greater detail below. These tables defined specific relationships between land use, and trip purpose. The use-table classified use-codes based on known Department of Revenue Resource Codes (DOR code's). DOR code's are used to define the type of property at a given location; for example residential or commercial. DOR codes used to generate use-codes were specifically obtained from the State of Florida Department of Revenue (FDOR). The use-table contained an auto-generated primary key field (code-id), the DOR_use_code (use-code) field, and a field for the property type description of the associated use-code (Property-Type). The use of additional fields is contemplated and will be apparent to those of skill in the art as needed for a given purpose. FIG. 2 is a table representing a few random rows of the table; the complete table used in this example is 282 rows long.

The purpose-table associates the use-codes to general and specific purposes. The purpose-table is populated with the same code-id's as the use-table. The General and Specific Purposes, FIG. 4, were related to the code-id's using a similar number-purpose association scheme as the U.S. Department of Transportation National Household Travel Survey. (See U.S Department of Transportation, National Household Travel Survey (NHTS); 2001 *NHTS User's Guide: Chapter 3 Survey Procedures and Methodology* and *Letter Report—National Household Travel Survey (NHTS)*, which are incorporated herein by reference). Because each code-id was associated with a use-code, the code-id's were classified based on DOR CODE property type descriptions from the FDOR website. FIG. 3 is an illustrative purpose table using code-ids shown in FIG. 2.

The locations-table consisted of several base locations and their coordinates associated with different user ids. The locations used for this example were Home and Work.

Data Collection

The data collection process for this example utilized a GPS enabled Motorola i870 cellular phone. GPS-enabled mobile phones were used in this example because they are inexpensive by comparison and are already owned by much of the population. Moreover, the FCC e911 mandate requires U.S. cellular carriers to be able to locate mobile phones when an emergency call is placed. Therefore, GPS-enabled mobile phones have great potential to serve as electronic travel surveys of the future.

An application installed on each cell-phone was initialized to start a new trip. For every new trip a trip-id was created that was associated with a user-id. As each user went about their errands, the application constantly sent GPS data to a server which recorded the user's travel behavior. Recording terminated when the user ended his/her trip and the GPS coordinates of the trip end-point were designated with a 1 under a field called "trip_end" in the trip-data table. The concluded trip information was recorded in the trip-table, which holds summary information for each trip such as general and specific trip purpose, mode-id and other automatically determined trip characteristics.

Detecting Trip Purpose

The method employed in this example required two components, the trip-id and its associated latitude and longitude pairs. An SQL query was executed against the trip-table to determined if the trip had ended. If the trip ended ("trip_end"=1), the method then executes a query against the trip-data table to retrieve and verify that the ending trip coordinate is valid GPS data, to ensure the latitude and longitude pairs were greater than zero. Valid GPS coordinates, in this example, are stored as an ArcObjects Point Feature. The method then utilized a GIS map of Hillsborough County (HBC) from ARCMAP™.

A proximity test was performed within the GIS map to determine if the distance between the trip-end coordinate and any base location (home or work) was greater than 50 meters. The proximity itself is a variable parameter; 50 meters was chosen for this example through estimation. Both the home and work locations coordinate were retrieved from the location-table. Multiple base locations were factored into the method to accommodate a user with more than one of either; the method therefore checks all proximity possibilities. If the condition of the proximity test was true the method updated the trip purpose based on which base location was nearest to the trip-end point; "8, null" and "1, null" are the general and specific purpose for home and work respectively. If the proximity test was false, a procedure called a spatial query was executed. Spatial queries determine any spatial relationships between geometries in an ARCMAP™ GIS map. The spatial query used for this example was a simple point-in-polygon calculation that determined what polygon on the GIS map the trip-end coordinate lied within. Once the valid polygon was located, the use-code field of the attribute table was accessed and the use-code was retrieved.

The method of this example then comprised a series of SQL queries. An outer join query that used the "code-id" fields from use-table and purpose-table was executed using the retrieved use-code.

A relationship to the General and Specific purposes from the purpose-table was established through the correlating "code-id" fields from both tables.

A final SQL query was performed to update the trips-table once the General and Specific Purpose ID numbers had been retrieved for the Trip-ID. Based on all of the stored and processed data the update query updated the fields "Auto_Detected_Purpose_ID," "Auto_Detected_Specific_Purpose_ID", "FL_HCO_PA_DOR_CODE_ID (DOR code)", and "Purpose_Detection_Completed" for the trip-table. The field "Purpose_Detection_Completed" was updated to a value of 1 from null once the trip purpose for a particular tripid was defined. This prevented any purposes from being rewritten by the method later.

In the illustrative embodiment, a user's GPS enabled device (such as a GPS-enabled cell phone) transmits latitude and longitude coordinate pairs to a server. Coordinates can be determined by any method known in the art, such as trilateration or triangulation. The coordinates are then associated with a trip-id value for the user. In alternate embodiments, the system can store all points collected that are associated with a trip-id or the system can store only the coordinates associated with the trip end point. The system associates a trip-end value with the coordinates and trip-id once the user indicates that the trip has ended. In a preferred embodiment, the system verifies that all coordinate values are greater than zero ensuring the end coordinates represent valid coordinates.

Also in a preferred embodiment, a proximity test is preformed within a GIS map to determine if the distance between the trip end point and a base location (home, work, etc.) associated with the user is within a predetermined distance (i.e. 50 meters). If the trip end point and a base location are within 50 meters of each other, the system then updates the trip purpose based on which base location was nearest the end point. If no base locations are within the predetermined vicinity, the system continues to detect the trip purpose.

A spatial query (such as a point-in-polygon calculation) is then executed using GIS database, preferably a GIS map, to determine which property comprises the end point (coordinates). The system next retrieves a use-code (such as a DOR CODE) from the GIS database. The use-code is then used to determine an associated code-id. The code-id, in turn, can be used to determine a particular general and specific purpose code associated with the code-id. The use-code, general purpose code, specific purpose code and any other desire information are then associated with the trip-id. This information is further associated with a detection-complete value. The detection-complete value is executed to reduce overhead in future executions of the system.

The inventive method is therefore able to determine location of the individual as well as capture information about the commercial or residential property visited. The method therefore augments traffic surveys and travel diaries with GPS data, or completely eliminates the dependency on methods that rely on a participants memory.

In this example the trip purpose was derived immediately after a trip ended and its data catalogued. In an alternate embodiment, each trip purpose is derived using batch updating. In this alternate embodiment, the "Purpose_Detection_Completed" field of the trip-table is checked for any trips whose purpose has not yet been defined after many trips have ended. The trip-data table is then queried for all the trips with a "1" in the "trip_end" field. Each trip is then processed consecutively by trip-id in the same fashion as in the example described above. Processing also includes all of the checks and tests as described above. The following snippets of code illustrate the objects and their parameters for each of the two versions of the aforementioned methods:

Single Update:
public PurposeDetector (int tripID, int Range)
Batch Update:
public PurposeDetector (Integer[ ] TripIDz, int Range)

Additional features are included in the inventive method to provide enhanced functionality. Illustrative features address discrepancies that would result when individuals shop at the same place they work, or perform drop-off's and pick-up's at locations that are not defined by an appropriate use-code; buildings such as strip-malls, for example, contain numerous use-codes. For all of these possibilities explanations and solutions were formulated. The first two scenarios are simply resolved by calculating the duration of elapsed time for each event. These time periods are then be compared to the user's work hours or to an estimation of elapsed drop-off/pick-up time (e.g 20 seconds).

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described.

What is claimed is:

1. A method of collecting user trip purpose data, the method comprising:

obtaining the user's end location using a GPS enabled device;

transmitting the user's end location to a server, the server storing a plurality of previously identified base locations in a location-table, each of the plurality of previously identified base locations associated with the user and the server storing a trip purpose associated with each of the plurality of previously identified base locations in the location table;

determining if one or more of the plurality of previously identified base locations stored in the location-table are within a predetermined distance from the user's end location by performing a proximity test by comparing the user's end location to each of the plurality of previously identified base locations stored in the location-table at the server;

if one or more of the plurality of previously identified base locations are determined to be within a predetermined distance from the user's end location, the server performing the following:

identifying a nearest previously identified base location as the previously identified base location of the one or more of the plurality of previously identified base locations determined to be within the predetermined distance from the user's end location that is nearest to the user's end location; and the server retrieving the trip purpose associated with the nearest previously identified base location from the location-table; and if none of the plurality of previously identified base locations are determined to be within a predetermined distance from the user's end location, the server performing the following:

spatially querying a geographic database with the user's end location;

resolving a use-code for the user's end location, wherein the use-code is associated with a code-id, and wherein a trip purpose is associated with the code-id; and cross-referencing the use-code to the trip purpose using the code-id, whereby the trip purpose of the user is derived.

2. The method of claim 1, wherein the geographic database comprises a plurality of predetermined locations associated with at least one use-code.

3. The method of claim 2, wherein resolving a use-code comprises:

associating the user's end location with at least one of the plurality of predetermined locations in the geographic database;

retrieving the use-code associated with the at least one location in the geographic database;

retrieving the code-id associated with the use-code; and retrieving the purpose associated with the code-id.

4. The method of claim 2, wherein the geographic database is a geographical information system (GIS) map.

5. The method of claim 4, wherein the plurality of predetermined locations are expressed on the GIS map as polygons comprising at least one set of coordinates; and wherein the at least one set of coordinates are associated with at least one location on the map by performing a point-in-polygon calculation to determine which polygon includes the user's end location.

6. The method of claim 1, wherein the trip purpose comprises a general purpose and a specific purpose.

7. The method of claim 1, wherein the user's end location comprises a set of coordinates and each of the coordinates in the set of coordinates associated with the user's end location is greater than zero.

8. The method of claim 1, further comprising:

establishing a use-table;

populating the use-table with a plurality of use-codes, wherein the plurality of use-codes are associated with a plurality of predetermined locations in the geographic database;

populating the use-table with a plurality of code-ids, wherein the plurality of code-ids are associated with the plurality of use-codes;

populating a purpose-table with the plurality of code-ids; and populating the purpose-table with at least one purpose associated with each code-id.

9. The method of claim 8, wherein the purpose-table is populated with at least one purpose which substantially corresponds to the U.S. Department of Transportation National Household Travel Survey.

10. The method of claim 8, wherein the code-id is retrieved by using the use-code to query the use-table.

11. The method of claim 8, further comprising:

establishing a trip-data table;

associating a trip-id with each trip and storing the trip-id in the trip-data table; and associating the user's end location with the trip-id in the trip-data table.

12. The method of claim 11, further comprising associating the trip-id with at least one parameter selected from the group consisting of a trip-end value, use-code, purpose code, specific purpose code, general purpose code, code-id and a trip end-point.

13. A method of automatically determining a trip purpose for a user, the method comprising:

obtaining a user's end location using a GPS enabled device;

transmitting the user's end location to a server, the server storing a plurality of previously identified base locations in a location-table, each of the plurality of previously identified base locations associated with the user and the server storing a trip purpose associated with each of the plurality of previously identified based locations in the location-table;

determining, by the server, a distance between the user's end location and each of the plurality of previously identified base locations stored in the location-table by comparing the user's end location to each of the plurality of previously identified base locations stored in the location-table;

identifying a nearest previously identified base location of the plurality of previously identified base locations stored in the location-table, wherein the nearest previously identified base location of the plurality of previously identified base locations is the previously identified base location nearest to the user's end location based upon the distance between the user's end location and each of the plurality of previously identified base locations:

resolving, by the server, the trip purpose of the user to be the trip purpose associated with the nearest previously identified base location stored in the location-table if the distance between the user's end location and the nearest previously identified base location is less than a predetermined distance; and performing, by the server, the following, responsive to the distance between the user's end location and the nearest previously identified base location being more than a predetermined distance:

spatially querying a geographic database with the user's end location, resolving a use-code for the user's end location using the results of the spatial query, wherein the use-code has a purpose associated with it, and resolving the trip purpose to be the purpose associated with the use code.

14. The method of claim 13, wherein the geographic database comprises a plurality of predetermined locations associated with the use-code.

15. The method of claim 14, wherein resolving a use-code comprises:

associating the user's end location with at least one location in the geographic database; and retrieving the use-code associated with the at least one location in the geographic database associated with the user's end location.

16. The method of claim 13, wherein the geographic database is a geographical information system (GIS) map.

17. The method of claim 16, wherein the plurality of previously identified base locations are expressed on the GIS map as polygons comprising at least one set of coordinates; and wherein the set of coordinates are associated with at least one location on the map by performing a point-in-polygon calculation to determine which polygon includes the user's end location.

18. The method of claim 13, wherein the trip purpose associated with the use-code comprises a general purpose and a specific purpose.

19. The method of claim 13, wherein the user's end location comprises a set of coordinates and each of the coordinates in the set of coordinates associated with the user's end location is greater than zero.

20. The method of claim 13, wherein the purpose associated with the use-code substantially corresponds to the U.S. Department of Transportation National Household Travel Survey.

\* \* \* \* \*